United States Patent

Riehl et al.

[11] Patent Number: 5,984,695
[45] Date of Patent: Nov. 16, 1999

[54] PLUG-IN MODULE FOR AN ELECTRIC MOTOR-DRIVEN WINDOW LIFT

[75] Inventors: Guenther Riehl; Martin Hager, both of Buehlertal, Germany

[73] Assignee: Robert Bosch GmbH, Stuttgart, Germany

[21] Appl. No.: 09/169,453

[22] Filed: Oct. 9, 1998

[30] Foreign Application Priority Data

Oct. 22, 1997 [DE] Germany ............................. 197 46 518

[51] Int. Cl.$^6$ ...................................................... H01R 9/09
[52] U.S. Cl. ............................................. 439/76.1; 310/71
[58] Field of Search ................................. 439/76.1, 76.2; 310/71, 68 R

[56] References Cited

U.S. PATENT DOCUMENTS 5,528,093  6/1996  Adam et al. ............................... 310/71

FOREIGN PATENT DOCUMENTS

| 688088 | 12/1995 | European Pat. Off. ......... H02K 5/22 |
| 42 42 641 | 6/1994 | Germany . |
| 43 37 390 | 4/1995 | Germany . |
| WO 97/16883 | 5/1997 | WIPO ............................. H02K 1/32 |

*Primary Examiner*—Khiem Nguyen
*Assistant Examiner*—T C Patel
*Attorney, Agent, or Firm*—Kenyon & Kenyon

[57] ABSTRACT

A plug-in module for an electric motor-driven window lift, in particular for use in a motor vehicle, is embodied so that it is economical to manufacture by having as few assembly steps as possible. The plug-in module is configured with a plug which has a plug housing made of plastic having partially injection-embedded plug contacts and motor contacts, a seal for sealing the plug against a drive housing of the window lift and a receptacle for at least one support element for electronic components being integrated. This support element makes electrical contact with the connector sections of the contact elements and the motor contacts upon insertion into the receptacle. The window lift is preferably used in automotive engineering.

6 Claims, 4 Drawing Sheets

PLUG-IN MODULE FOR AN ELECTRIC MOTOR-DRIVEN WINDOW LIFT

Field of the Invention

The present invention relates to a plug-in module for an electric motor-driven window lift that is preferably used in a motor vehicle.

Background Information

In a conventional electric motor-driven window lift, a plug-in module is provided for an electronic control and regulation system, for mounting on a drive housing of the window lift. The plug-in module has a plastic part which carries a plug for transferring signal currents, and motor contacts for transferring power currents. The plastic part is connected mechanically and electrically to a circuit board of the plug-in module. The circuit board having the plastic part is inserted into a housing of the plug-in module, and then sealed with cast resin in the region of the plug.

Because of the many assembly steps, the manner in which the plug-in module is manufactured is cost-intensive and unfavorable in terms of production engineering.

Summary of the Invention

The plug-in module according to the present invention for an electric motor-driven window lift has the advantage that the aforementioned shortcoming is avoided to a satisfactory degree. For this purpose, the plug-in module is configured with a plug which includes a plug housing having injection-embedded plug contacts, a seal for sealing the plug in the drive housing, the motor contacts for transferring the power currents, and a receptacle for a support element for electronic components that can be used in contacting manner, being integrated into the plastic housing.

The plug thus contains all the additional components of the plug-in module, thus reducing the assembly steps for the plug-in module and allowing economical production of the plug-in module.

DETAILED DESCRIPTION

Figure 1:
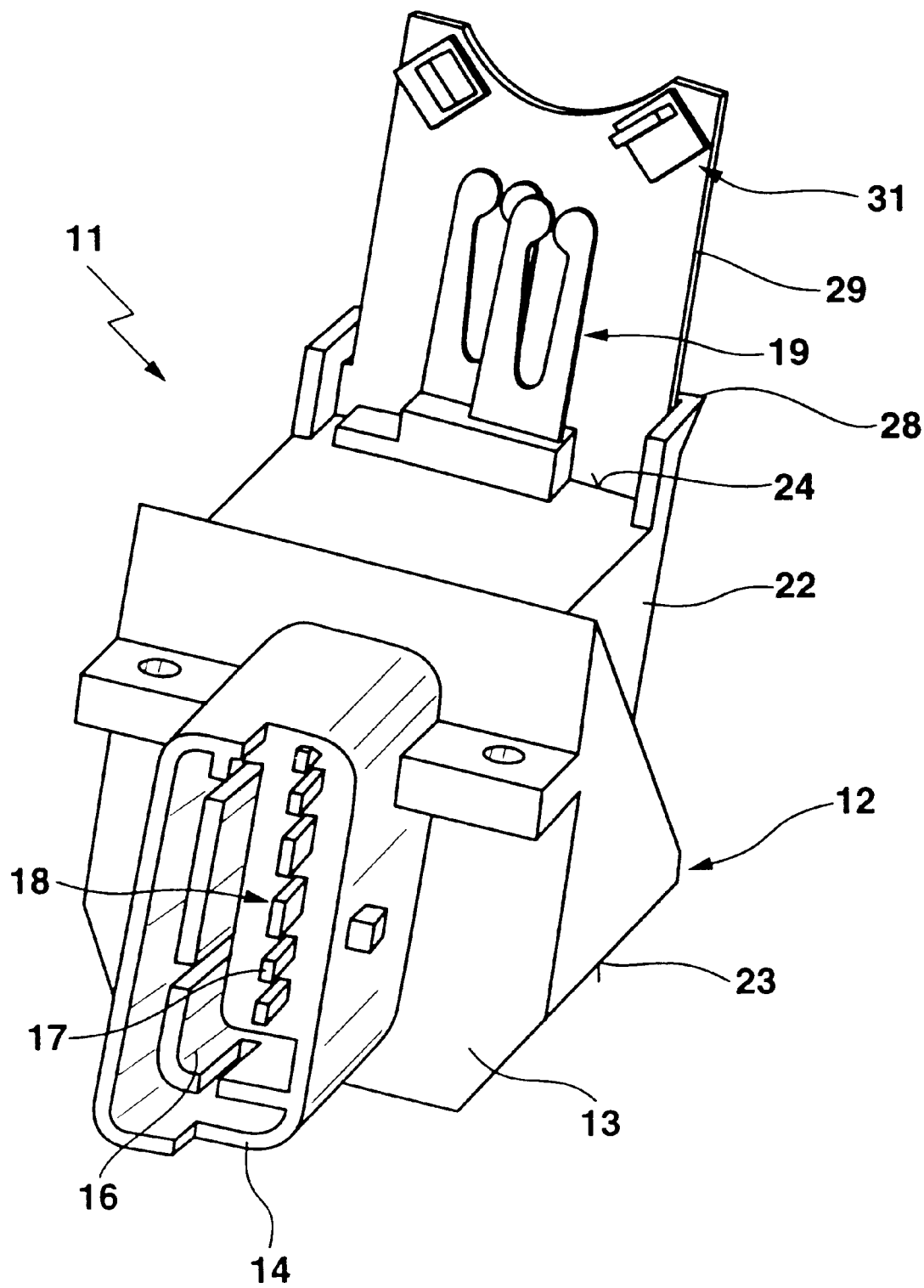
FIG. 1 shows a front view of a plug-in module according to the present invention.

A plug-in module according to the present invention for an electric motor-driven window, as shown in FIG. 1, contains as its principal component a plug 11. Plug 11 has a step-like, partially open, one-piece plug housing 12 made of plastic. Projecting from a flat front wall 13 of plug housing 12, and perpendicular thereto, is a peripherally continuous thin-walled collar 14.

Collar 14 delimits an internal receiving pocket 16 in which contact sections 17 are arranged in a row. Contact sections 17 are exposed end sections of contact elements 18 and motor contacts 19 which are partially injection-embedded into plug housing 12. Collar 14 forms a mechanical protective wall for contact sections 17, and serves as a guide element for a mating plug (not depicted) whose insertion travel onto collar 14 is limited by front wall 13.

Figure 2:
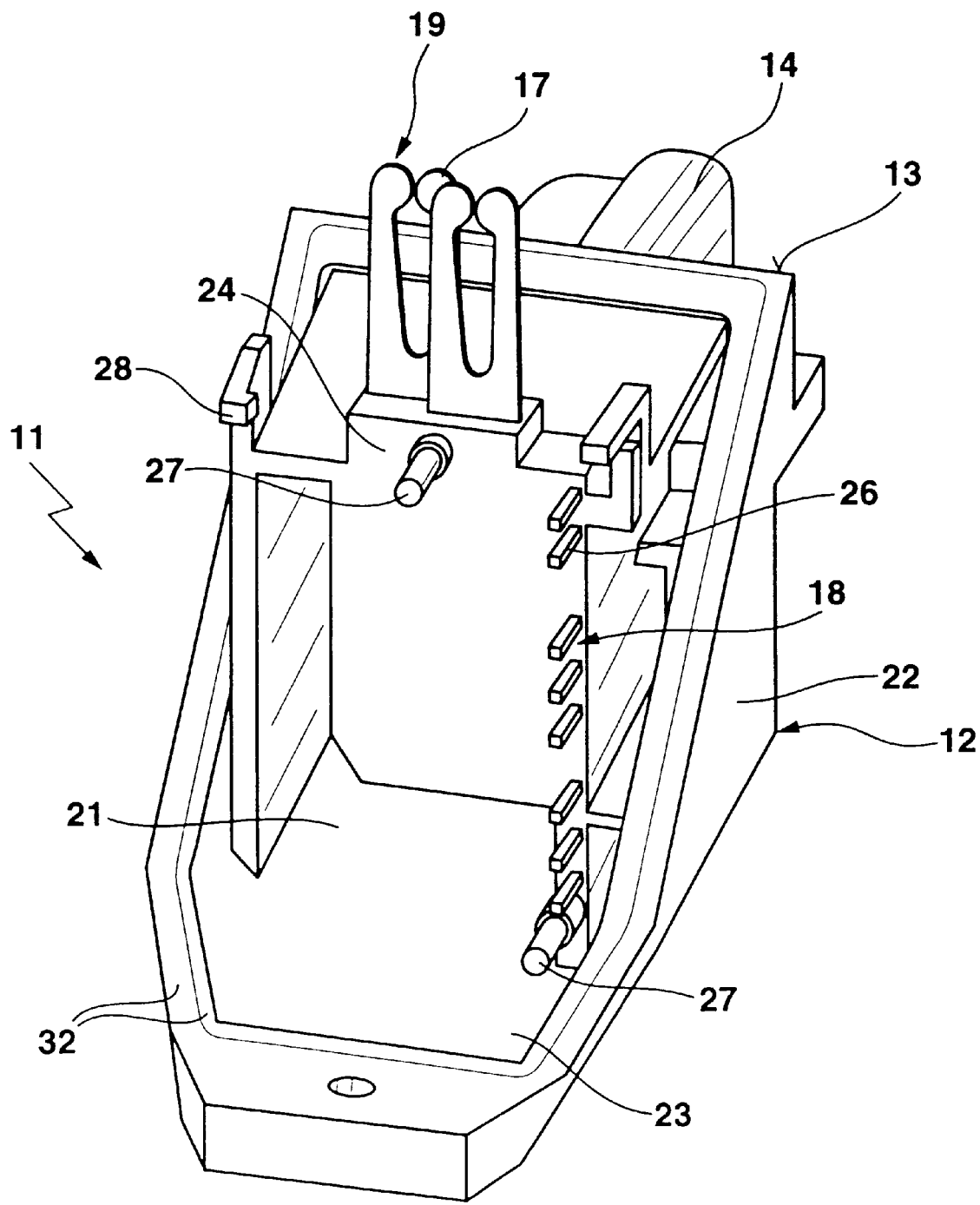
FIG. 2 shows a rear view of the plug-in module without electronic components.
Figure 3:
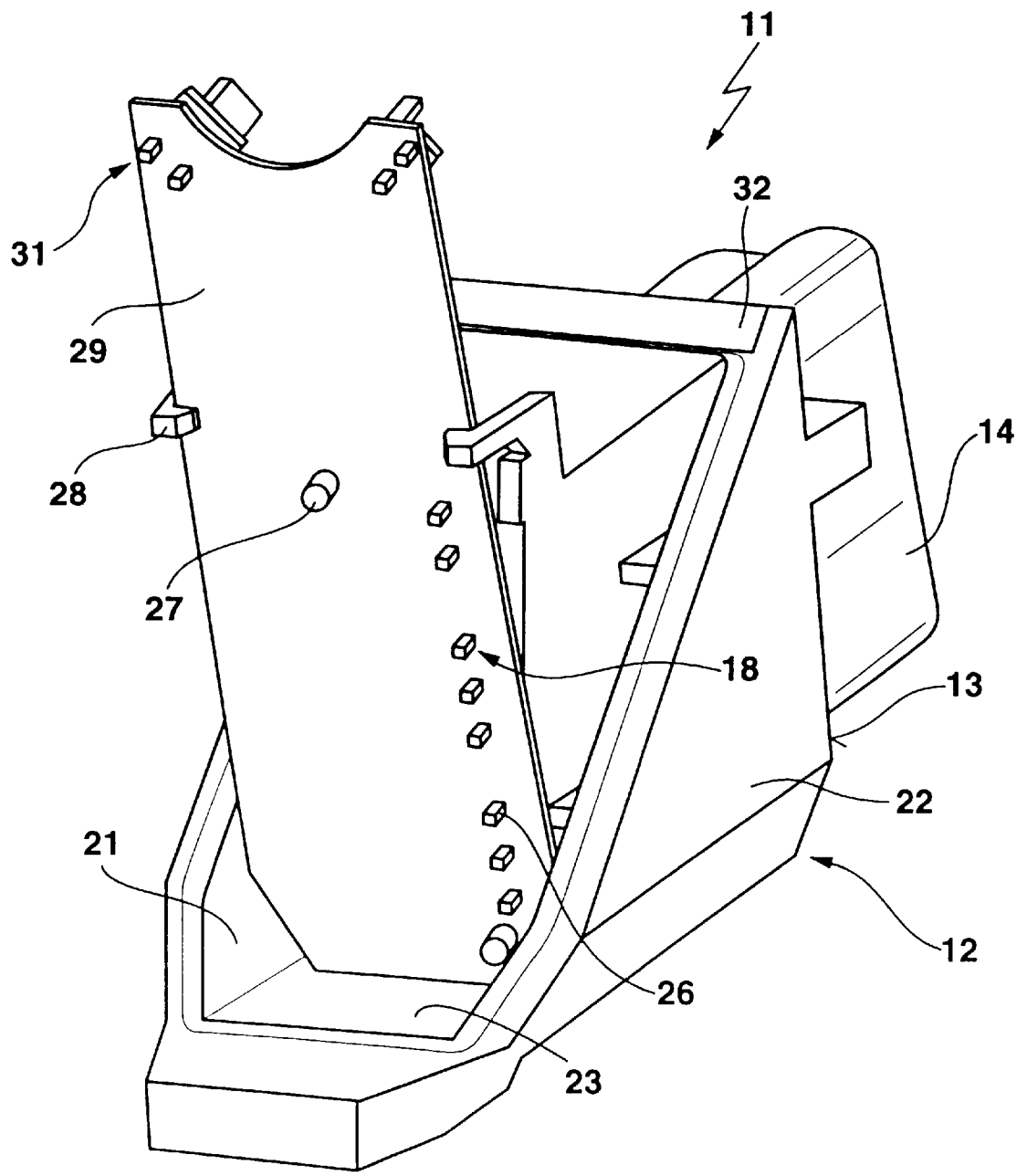
FIG. 3 shows the rear view of the plug-in module with the electronic components.
Figure 4:
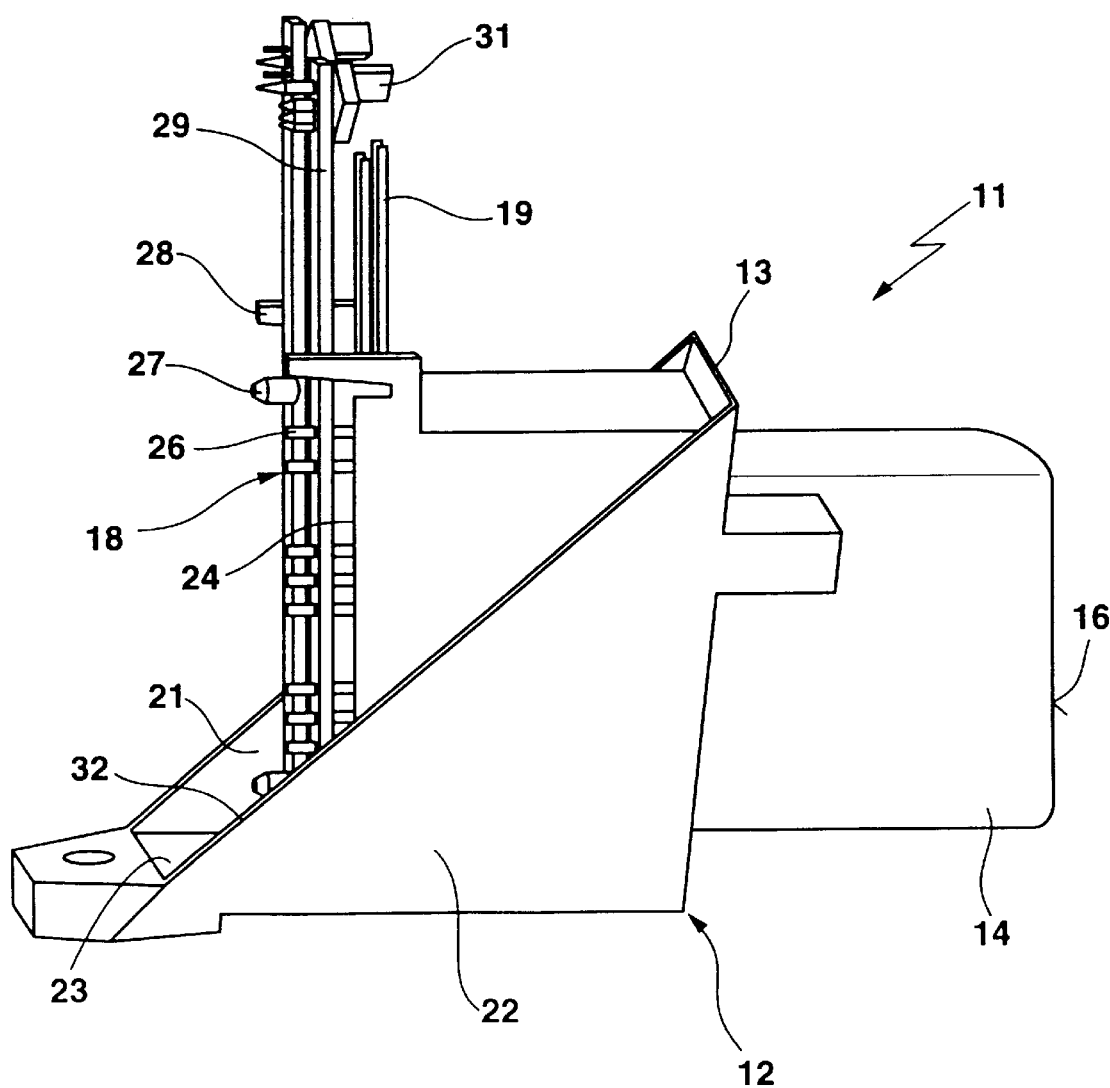
FIG. 4 shows a side view of the plug-in module.

As depicted in FIGS. 2 through 4, and as evident in particular from FIG. 2, plug housing 12 has, on the side of front wall 13 opposite collar 14, a partially open receiving space 21 that is delimited laterally by sidewalls 22 which are parallel to one another and, starting from a floor 23 of plug housing 12, rise in ramped manner and attain the vertical extension of front wall 13 at the end thereof.

Emerging from receiving space 21 is a back wall 24, arranged parallel to front wall 13, from which project exposed pin-shaped connector sections 26 of contact elements 18 and motor contacts 19 arranged in a row, as well as stud-shaped centering pins 27 spaced away from the latter. Also projecting from back wall 24 are boom-like attachment hooks 28.

Using attachment hooks 28 and centering pins 27, a circuit board 29 constituting a support element for electronic components 31 which are parts of an electronic control and regulation system of the window lift and comprise, for example, a Hall sensor, can be attached to back wall 24 as depicted in FIG. 3 so that connector sections 26 of contact elements 18 emerge in electrically contacting manner through associated contact openings of circuit board 29, while connector sections 26 of motor contacts 19 extend in exposed manner parallel to circuit board 29, as is evident from FIG. 4.

Plug 11, with plug housing 12 configured and populated in this manner, is mounted as a plug-in module onto a drive housing (not depicted) of the window-lift, the exposed tongue-shaped contact sections 17 of motor contacts 19 being guided resiliently against associated contact points of the drive motor.

For protection from contamination, a seal 32 is mounted peripherally on the delimiting end surfaces of receiving space 21 and, when plug 11 is combined with the drive housing, rests in non-positive contact against the latter.

Because all the components of the plug-in module are integrated onto plug 11, the latter can be produced economically as a result of the reduction in assembly steps thus made possible.

What is claimed is:

1. A plug-in module for an electric motor-driven window lift, the plug-in module being mounted on a drive housing of the electric motor-driven window lift, the plug-in module comprising:

a plug including a plug housing having partially injection-embedded plug contacts and partially injection-embedded motor contacts, the plug housing being composed of a plastic material;

a seal for sealing the plug against the drive housing;

a receptacle integrated in the plug housing; and at least one support element inserted into the receptacle in a contacting manner to form the plug-in module, the at least one support element supporting a plurality of electronic components.

2. The plug-in module according to claim 1, wherein the plug-in module is adapted for use in an electric window of a motor vehicle.

3. The plug-in module according to claim 1, wherein the plug housing is formed from one-piece and includes a receiving pocket situated on a front wall of the plug housing, the receiving pocket including first contact sections for the partially injection-embedded plug contacts and second contact sections for the partially injection-embedded motor contacts.

4. The plug-in module according to claim 3, wherein a first side of the plug housing forms a receiving space, the first side facing away from the receiving pocket, and wherein the first and second contact sections and the receptacle project from a back wall of the plug housing, the back wall extending from the receiving space.

5. The plug-in module according to claim 4, wherein the at least one support element includes a circuit board, the circuit board making an electrical contact with the first and second contact sections upon insertion into the receptacle.

6. The plug-in module according to claim 5, wherein the seal is mounted on upper, peripherally delimiting end surfaces of the receiving space.

\* \* \* \* \*